(12) United States Patent
Takahashi

(10) Patent No.: US 6,318,233 B1
(45) Date of Patent: Nov. 20, 2001

(54) BRAKE BOOSTER APPARATUS

(75) Inventor: Mitsugu Takahashi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/537,044

(22) Filed: Mar. 28, 2000

(30) Foreign Application Priority Data

Mar. 30, 1999 (JP) .................................................. 11-087669

(51) Int. Cl.$^7$ ...................................................... F15B 9/10
(52) U.S. Cl. ...................................................... 91/376 R
(58) Field of Search ........................ 91/368, 374, 376 R, 91/377, 378

(56) References Cited

U.S. PATENT DOCUMENTS 4,718,324 * 1/1988 Gautier et al. ................. 91/376 R X
5,528,975 * 6/1996 Gautier et al. .................... 91/376 R

FOREIGN PATENT DOCUMENTS 61163051 7/1986 (JP) .

* cited by examiner

Primary Examiner—John E. Ryznic
(74) Attorney, Agent, or Firm—Martin A. Farber

(57) ABSTRACT

In a vacuum type brake booster apparatus, the response in an initial stage of operating brakes is made sluggish so as to improve the brake feeling in a normal operation area, while the response is improved at the time of panic braking when the brake pedal is largely depressed to thereby reduce a stopping distance at the time of braking. A throttling mechanism is constituted by a position variable piston fixed to an operating rod of a brake booster of a vacuum type and a circumferential wall portion surrounding the position variable piston with a certain gap being formed therebetween. The gap thus formed constitutes an atmospheric pressure inlet passage into a variable pressure chamber, and the size of the gap is constructed so as to be varied when the position of the position variable piston is changed relative to the circumferential wall portion through an axial actuation of the operating rod, whereby the incoming volume per unit time of the atmospheric pressure into the variable pressure chamber is constructed to be varied in response to the brake pedal depression stroke in such a manner that the incoming volume remains small in the initial stage of operating the barke pedal, while it increases as the brake pedal depression stroke increases.

4 Claims, 4 Drawing Sheets

BRAKE BOOSTER APPARATUS

BACKGROUND OF THE INVENTION

1. Field of the Invention

The present invention relates to a brake booster apparatus and more particularly to a brake power assist apparatus of a vacuum type.

2. Prior Art

A brake booster apparatus of a vacuum type as shown, for instance, in FIG. 4 is used in general for a brake booster apparatus for a vehicle. Namely, as shown in FIG. 4, in a booster (a) of a vacuum type provided between a brake pedal (p) and a master cylinder (m), the interior of a shell thereof is divided into a constant pressure chamber (b) and a variable pressure chamber (c) by a diaphragm (d), and when the brake pedal (p) is not operated, a vacuum from a vacuum source such as an intake manifold is led into both the constant pressure chamber (b) and the variable pressure chamber (c), and thus the diaphragm (d) remains unoperative. On the contrary, when the brake pedal (p) is depressed, a valve mechanism, not shown, is opened via an operating rod (e), an outside air (atmospheric pressure) is introduced into the variable pressure chamber (c) to thereby produce a pressure difference between the variable pressure chamber (c) and the constant pressure chamber (b), and the diaphragm (d) is sucked and actuated forward by this pressure difference. Then, the operating force of the diaphragm (d) is added to the depression force of the brake pedal (p), and a push rod (not shown) then forcibly actuates a piston (not shown) of the master cylinder (m).

As described above, since the booster of a vacuum type is constructed such that the pressure difference between the constant pressure chamber (b) and the variable pressure chamber (c), i.e., the force sucking the diaphragm (d) is added to the pedal (p) depression force to thereby produce a force for pushing the piston of the master cylinder (m), even female and aged drivers, who tend to be regarded as not being strong, can operate the brakes relatively easily.

A booster of a vacuum type as described above was developed and is disclosed in Japanese Unexamined Patent publication No. Toku-Kai-Sho 61-16305, and in this disclosed booster, a variable throttle valve is provided at a position along an inlet passage of the atmospheric pressure into a variable pressure chamber (c), and the throttling of this variable throttle valve is regulated via a controller by operating a manual switch to close it.

The way to depress the brake pedal and depression force applied thereto depend on drivers, and a preferable braking performance relative to a depression force applied to the brake pedal also depends on drivers. Thus, the prior art described above is effective in that the performance of the booster is suitably set depending on the habit or preference of drivers themselves in which the degree of throttling the variable throttle valve is regulated by operating the manual switch.

However, with a view to optimizing the braking feeling, for instance, if the area of the atmospheric pressure passage is made small and the inlet volume per unit time of the atmospheric pressure is set so as to be small over the whole brake operating areas (i.e., the response of the booster is reduced), although a good brake feeling can be attained in the normal brake operating area, there is caused a delay in obtaining a desired braking performance in panic braking, this causing in turn a risk of lengthening a distance required to bring the vehicle to a halt. On the contrary, with a view to mainly improving the response in panic braking, if the inlet volume per unit time of the atmospheric pressure is set slightly large, there is caused a slightly small problem with the brake feeling in the normal using area.

SUMMERY OF THE INVENTION

An object of the present invention is to solve the aforesaid problem inherent in the prior art booster.

As described above, the present invention provides a brake booster of a negative pressure type constructed such that a valve mechanism is opened by actuating an operating rod in an axial direction by depressing a brake pedal, so that an atmospheric pressure is allowed to flow into a variable pressure chamber from the valve mechanism, whereby a diaphragm is sucked to be actuated by virtue of a negative pressure in a constant pressure chamber and an operating force of the diaphragm is added to the depression force of the brake pedal to thereby forcibly actuate a piston of a master cylinder, the brake booster of a negative pressure type comprising a throttling mechanism for varying the inlet volume per unit time of the atmospheric pressure into the variable pressure chamber in response to a depression stroke of the brake pedal. To be specific, the aforesaid throttling mechanism is constituted by a position variable piston fixed to the operating rod adapted to be actuated in the axial direction in response to a depression of the brake pedal and a circumferential wall portion surrounding an outer circumference of the position variable piston with a certain gap being formed therebetween, wherein the gap between the outer circumference of the position variable piston and the outer circumferential wall constitutes an atmospheric pressure inlet passage leading to the variable pressure chamber, and wherein the size of the gap is varied when the position of the position variable piston is varied relative to the circumferential wall portion through an axial actuation of the operating rod, whereby the inlet volume per unit time of the atmospheric pressure into the pressure variable chamber is varied.

DESCRIPTION OF PREFERRED EMBODIMENTS

Figure 1:
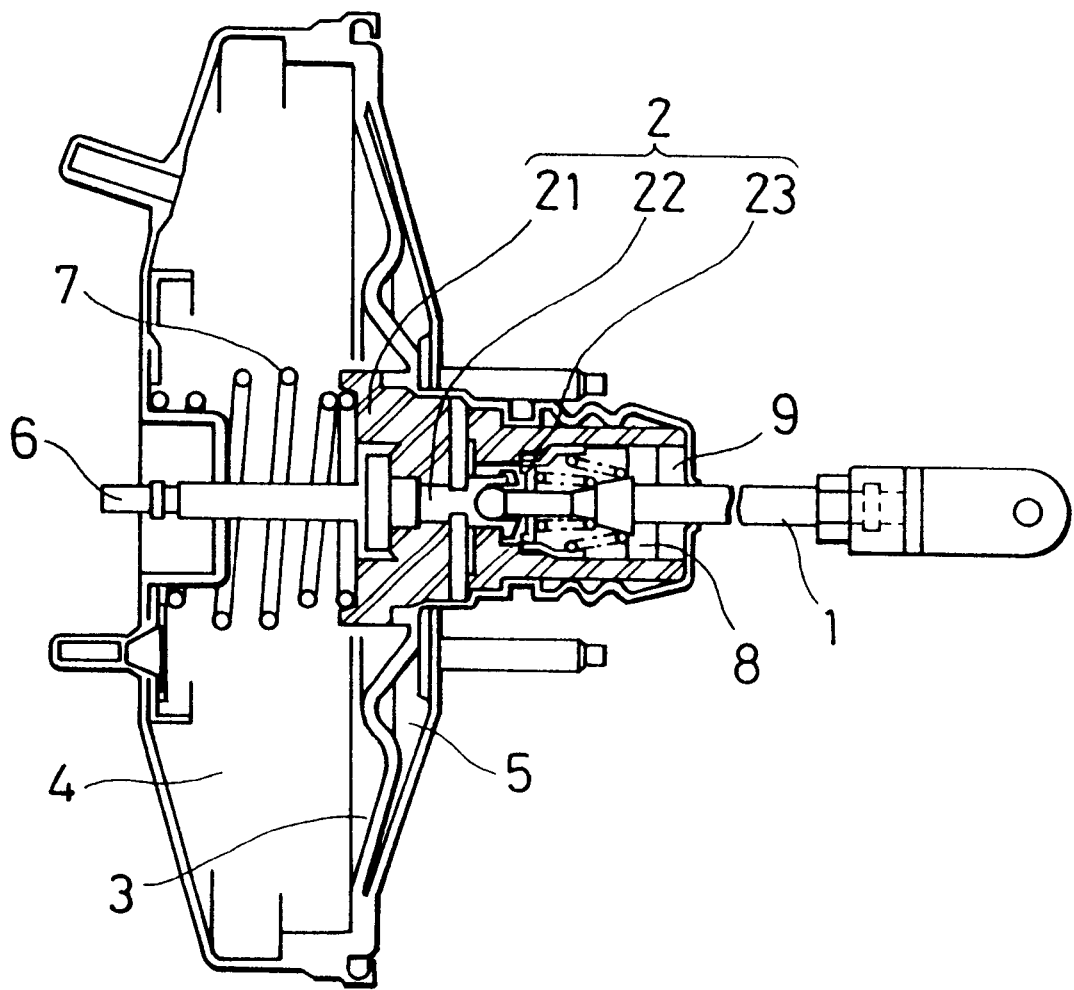
FIG. 1 is a cross sectional view showing an example of a vacuum type brake booster apparatus to which the present invention is applied.

FIG. 1 is a vertical sectional view showing an embodiment of a booster of a negative pressure type to which the present invention is to be applied, and the booster basically comprises an operating rod 1 connected to a brake pedal, which is not shown, at one end thereof, a valve mechanism 2 adapted to be actuated through an axial stroke of the operating rod 1, a diaphragm 3 partitioning the interior of a shell into a constant pressure chamber 4 and a variable pressure chamber 5, a push rod 6 and a return spring 7.

In this construction, when the brake pedal is inoperative, a vacuum from an intake manifold or the like is led into both the constant pressure chamber 4 and the variable pressure chamber 5, which are then put in a vacuum state, and in this state, a valve body 21 is pressed rearward (rightward as seen in the-figure) by means of the return spring 7, whereby a valve plunger 22 and a seal 23 are brought into contact with each other to thereby put a valve mechanism 2 in a closed state.

When the brake pedal is stepped on, the valve plunger 22 is pushed forward (leftward as seen in the figure) via the operating rod 1, and this creates a gap between the seal 23 and the valve plunger 22 (the valve mechanism 2 is opened), whereby the atmospheric pressure comes into the variable pressure chamber 5 through a filter silencer 8. When the atmospheric pressure flows into the variable pressure chamber 5, there is caused a pressure difference between the variable pressure chamber 5 and the constant pressure chamber 4, and the diaphragm 3 is sucked forward by virtue of the pressure difference so produced. Then, the valve body 21 fixed to the diaphragm 3 moves forward, and the push rod 6 then pushes and actuates a piston in a master cylinder for braking with a force constituted by the brake pedal depression force and the aforesaid sucking force which sucks the diaphragm 3 forward, a great magnitude of master cylinder actuating pressure being thus obtained with a small magnitude of brake pedal depression force.

A vacuum booster as described above has conventionally been used in brake systems of general passenger vehicles and been well known, and therefore a further description thereof will be omitted.

In the booster of a vacuum type that has conventionally been used in general as described above, according to the present invention, there is provided a throttling mechanism for varying an inlet volume per unit time of the atmospheric pressure into the variable pressure chamber 5 in response to the stroke of the brake pedal when it is depressed (in other words, the stroke of the operating rod 1 in the axial direction), and to be specific, the throttling mechanism comprises a position variable piston which varies its position in response to the brake pedal depression stroke and a circumferential wall portion surrounding a circumferential portion of the position variable piston with a certain gap being formed therebetween. In this construction, the opening area of an atmospheric pressure inlet passage constituted by the gap formed between the outer circumference of the position variable piston and the circumferential wall portion is varied to thereby vary the inlet volume per unit time of the atmospheric pressure into the variable pressure chamber 5.

Figure 2:
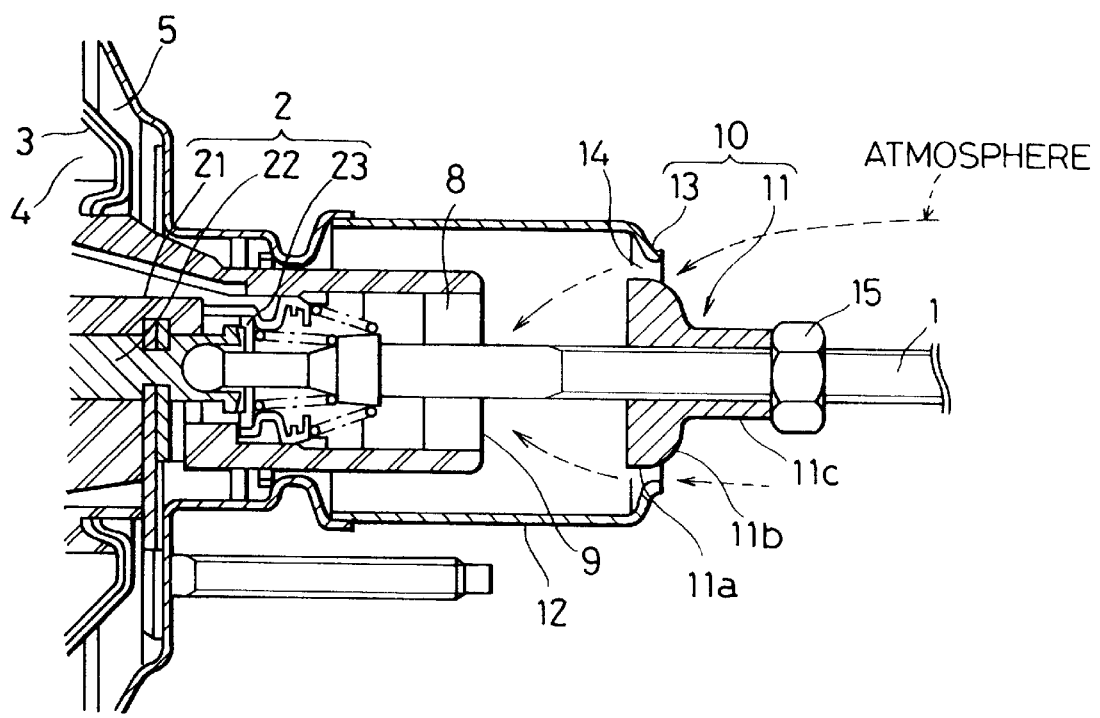
FIG. 2 is a cross sectional view showing an embodiment of the present invention.

In FIG. 2, a throttling mechanism 10 comprises a position variable piston 11 screw fixed to an operating piston 1, a cylindrical portion 12 secured to a rear end of a shell in such a manner as to surround the outer circumference of an atmospheric pressure inlet port 9 of the vacuum booster and a circumferential wall portion 13 formed by drawing inwardly a rear of the cylindrical portion 12, whereby a gap 14 formed between an outer circumferential surface of the position variable piston 11 and an internal surface of the circumferential wall portion 13 is constructed so as to constitute an inlet passage of the atmospheric pressure into the variable pressure chamber 5.

The position variable piston 11 has a shape configured, as shown, to comprise contiguously a large diameter portion 11a extending over a predetermined extent at a front end portion of the-piston ii, an inclined portion 11b following a rear of the large diameter portion 11a in such a manner as be gradually reduced in diameter and a smallest diameter portion 11c following a rear of the inclined portion 11b. In this construction, the position variable piston 11 is constructed such that in a state in which the brake pedal is not operated, the large diameter portion 11a is located inwardly of the circumferential wall portion 13, when a predetermined gap is formed between an outer circumferential surface of the large diameter portion 11a and an internal circumferential surface of the circumferential wall portion 13.

In the above construction, as described previously, a valve mechanism is put in an opened state when an operating rod is moved forward in conjunction with a depression of the brake pedal, and the atmospheric pressure flows from an atmospheric pressure inlet port 9 into the variable pressure chamber 5 via a filter silencer 8 after passing through the gap 14 formed as an inlet passage between the position variable piston 11 and the circumferential wall portion 13. However, in an initial stage in which the brake pedal starts to be depressed, since the large diameter portion 11a of the position variable piston 11 is located inwardly of the circumferential wall portion 13, the gap 14 is being in a doughnut-like configuration and hence it is still narrow. Consequently, the inlet volume per unit time of the atmospheric pressure into the variable pressure chambers is small, and the effect or response of the booster remains sluggish.

Then, as the stroke of the brake pedal, which is being depressed, increases, the position variable piston 11 is also moved forward together with the operating rod 1, and when the inclined portion 11b passes through the inside of the circumferential wall portion 13, the gap 14 starts to be gradually widened. In conjunction therewith, the inlet volume per unit time of the atmospheric pressure increases gradually, and the effect or response of the booster is getting better in response to the increase in depression distance of the brake pedal.

When the brake pedal depression stroke exceeds a predetermined distance, the small diameter portion 11c comes to be positioned inside the circumferential wall portion 13, when the gap becomes maximum, and hence the inlet volume per unit time of the atmospheric pressure becomes maximum, whereby the response of the booster can be improved very much.

Figure 3:
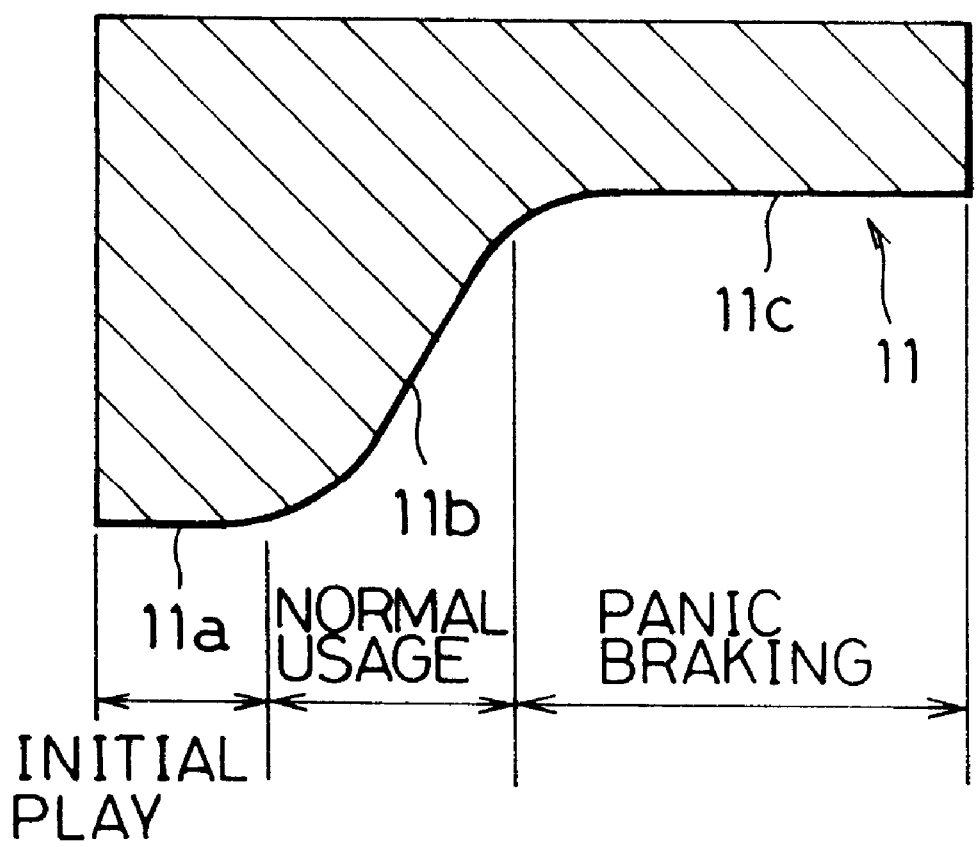
FIG. 3 is an explanatory view showing a relationship between a position variable piston and a depression stroke of a brake pedal.
Figure 4:
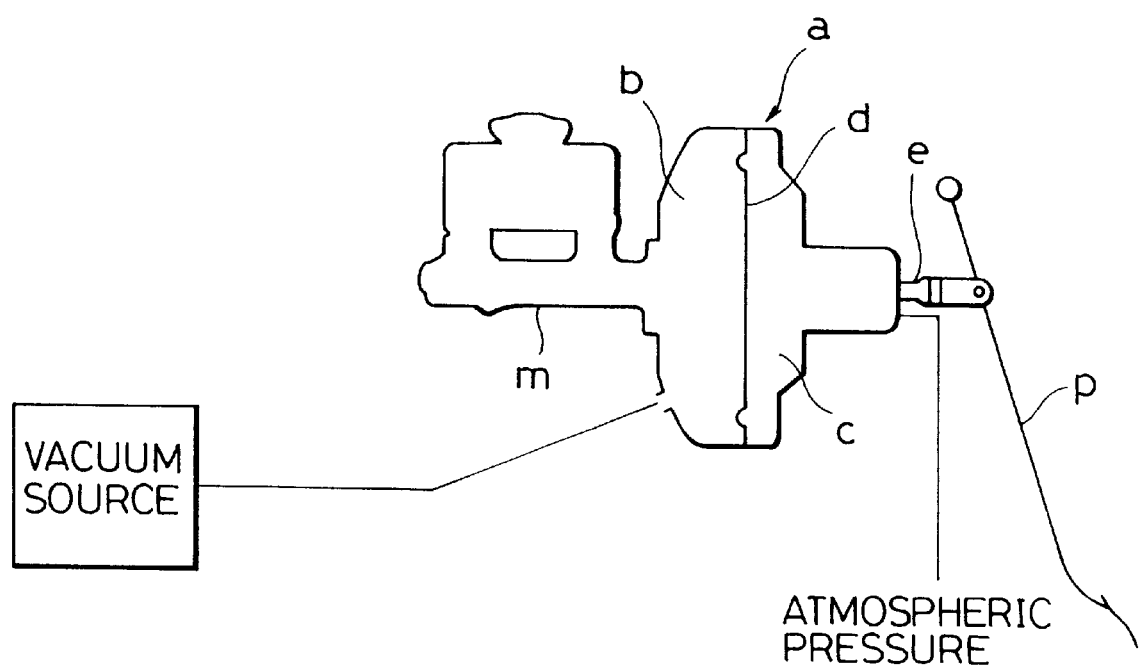
FIG. 4 is a schematic view of a brake apparatus having a vacuum type brake booster device.

As shown in FIG. 3, now defining the large diameter portion 11a of the position variable piston 11 as a play area of the brake pedal in the initial stage of depressing the brake pedal, the inclined portion 11b as a normal brake operating area and the small diameter portion 11c as a panic braking area, by suitably setting the respective diameters (the gap areas between the circumferential wall portion 13 and the respective areas), the length relative to the stroke direction (axial direction) and the degree of inclination of the inclined portion 11b, the response of the booster in the initial stage of depressing the brake pedal can be made sluggish, the brake feeling in the normal brake operating area can be improved, and the response of the booster can be improved at the time of panic braking when the brake pedal is largely depressed, thereby making it possible to reduce a distance required before the vehicle is brought to a halt.

As the illustrated embodiment illustrates, by adopting a measures for constructing the circumferential wall portion 13 by draw deforming a part of the cylindrical portion 12 inwardly, the circumferential wall portion 13 can easily be worked into a shape configured to reduce as much as possible foreign noise produced when the atmospheric pressure flows through the gap 14.

In addition, as shown in FIG. 2, if a construction is adopted in which the position variable piston 11 is secured to the operating rod 1 with a threaded lock nut 15, the fixing position or the position variable piston 11 can easily be changed by loosening the lock nut 15 for rotation of the position variable piston 11. Thus, the changing position of the response of the booster can be changed and regulated by changing the fixing position of the position variable piston 11.

In the embodiments shown in the accompanying drawings, the present invention has been described as being applied to a single negative pressure booster, but the present invention is not limited to those illustrated in the drawings, and it may be applied to a tandem type negative pressure booster or any other types of negative pressure boosters conventionally known to the public.

As has been described heretofore, according to the present invention, the response of the booster in the initial stage of depressing the brake pedal can be made sluggish, the brake feeling in the normal brake operating area can be improved, and the response of the booster can be improved at the time of panic braking when the brake pedal is largely depressed, thereby making it possible to reduce a distance required before the vehicle is brought to a halt by providing the throttling mechanism for varying the inlet volume per unit time of the atmospheric pressure into the variable pressure chamber by varying the area of the inlet passage in response to a depression stroke of the brake pedal at a position along the inlet passage of the atmospheric pressure into the variable pressure chamber in the brake booster of a negative pressure type constructed such that the valve mechanism is opened by actuating the operating rod in the axial direction by depressing the brake pedal, so that the atmospheric pressure is allowed to Flow into the variable pressure chamber, whereby the diaphragm is sucked to be actuated by virtue of a negative pressure in the constant pressure chamber and the operating force of the diaphragm is added to the depression force of the brake pedal to thereby forcibly actuate the piston of the master cylinder. Thus, the booster according to the present invention is practically greatly advantageous in that it is simple in construction, relatively inexpensive in cost and can be tuned with respect to the changing position of the response of the booster in accordance with the driving skill of the driver and running conditions.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A vacuum type brake booster apparatus having an operating rod connected with a brake pedal, a valve mechanism opened when said operating rod is moved in the axial direction, a variable pressure chamber, a constant pressure chamber in a vacuum condition, a diaphragm provided between said variable pressure chamber and said constant pressure chamber and a piston of a master cylinder actuated by said diaphragm when said valve mechanism opens to introduce an atmospheric pressure into said variable pressure chamber, comprising:

a throttling mechanism for varying an incoming amount per unit time of said atmospheric pressure into said variable pressure chamber in accordance with a depression stroke of said brake pedal.

2. The brake booster apparatus according to claim 1, wherein said throttling mechanism is constituted by a position variable piston fixed to said operating rod adapted to be actuated in the axial direction in response to a depression of said brake pedal and a circumferential wall portion surrounding an outer circumference of said position variable piston with a certain gap being formed therebetween, wherein said gap between said outer circumference of said position variable piston and said outer circumferential wall constitutes an atmospheric pressure inlet passage communicating with said variable pressure chamber, and wherein the size of said gap is varied when the position of said position variable piston is varied relative to said circumferential wall portion through an axial actuation of said operating rod, whereby said incoming volume per unit time of said atmospheric pressure into said pressure variable chamber is varied.

3. The brake booster apparatus according to claim 2, wherein said position variable piston has a shape configured so as to have a large diameter at the front and to be decreased in diameter toward the rear thereof.

4. The brake booster apparatus according to claim 2, wherein the fixing position of said position variable piston relative to said operating rod is constructed so as to be moved for adjustment in the axial directions.

* * * * *